United States Patent
Jin et al.

(10) Patent No.: US 8,538,959 B2
(45) Date of Patent: Sep. 17, 2013

(54) PERSONALIZED DATA SEARCH UTILIZING SOCIAL ACTIVITIES

(75) Inventors: Hongxia Jin, San Jose, CA (US); Qihua Wang, San Jose, CA (US)

(73) Assignee: International Business Machines Corporation, Armonk, NY (US)

( * ) Notice: Subject to any disclaimer, the term of this patent is extended or adjusted under 35 U.S.C. 154(b) by 236 days.

(21) Appl. No.: 12/838,082

(22) Filed: Jul. 16, 2010

(65) Prior Publication Data
US 2012/0016875 A1    Jan. 19, 2012

(51) Int. Cl.
*G06F 7/00* (2006.01)
*G06F 17/30* (2006.01)

(52) U.S. Cl.
USPC .......................................... 707/732

(58) Field of Classification Search
CPC ............... G06F 17/30867; G06F 17/30864; G06F 17/30699; G06Q 30/02; G06Q 10/10
USPC ...................... 707/706, 732, 723
See application file for complete search history.

(56) References Cited

U.S. PATENT DOCUMENTS

| | | | | |
|---|---|---|---|---|
| 7,702,653 | B1 * | 4/2010 | Tan et al. | 707/999.107 |
| 2003/0014428 | A1 * | 1/2003 | Mascarenhas | 707/200 |
| 2008/0114737 | A1 | 5/2008 | Neely et al. | |
| 2009/0077033 | A1 | 3/2009 | McGary et al. | |
| 2009/0164929 | A1 | 6/2009 | Chen et al. | |
| 2009/0204599 | A1 | 8/2009 | Morris et al. | |
| 2009/0248494 | A1 * | 10/2009 | Hueter et al. | 705/10 |
| 2009/0248682 | A1 * | 10/2009 | Hueter et al. | 707/5 |
| 2009/0307057 | A1 * | 12/2009 | Azout et al. | 705/10 |
| 2010/0082658 | A1 | 4/2010 | Athsani et al. | |
| 2010/0082953 | A1 * | 4/2010 | Chiu | 712/239 |
| 2010/0094869 | A1 | 4/2010 | Ebanks | |

FOREIGN PATENT DOCUMENTS

KR    10-2009-0131914 A    12/2009

OTHER PUBLICATIONS

Microsoft, Singhal, N. et al, (Apr. 19, 2007), "A System for Implementing MSN Spaces Search Via Spaces Meta Data Using MSN Search"; Technical Disclosure; IP.com No. IPCOMM000150867D, 1-7.
Google (2009). Google Social Search; retrieved from www.google.com/support/websearch/bin/answer.py?hl=165228   http://goggleblog.blogspot.com/2009/10/introducing-google-social-search-i.html.
How Social Networking Could Kill Web Search as We Know It; *Popular Mechanics*, retrieved from http://www.popularmechanics.com/technology/gadgets/news/4259135.

* cited by examiner

*Primary Examiner* — Kimberly Wilson
*Assistant Examiner* — Hexing Liu
(74) *Attorney, Agent, or Firm* — Fleit Gibbons Gutman Bongini & Bianco PL; Thomas Grzesik

(57) ABSTRACT

Embodiments relate personalized data searches utilizing social activities. In one embodiment, a search query is received from a user. A set of search results that satisfy the search query is received from a search engine. A user interest profile associated with the user is identified. The user interest profile includes information associated with a set of activities performed by the user on one or more social systems. A ranking score is assigned to each result in at least a subset of search results in the set of search results based at least on the user interest profile. The subset of search results are sorted based on the score that has assigned to each result in the subset of results. The subset of search results that has been sorted is sent to the user.

16 Claims, 9 Drawing Sheets

PERSONALIZED DATA SEARCH UTILIZING SOCIAL ACTIVITIES

BACKGROUND

The present invention generally relates to data searches, and more particularly relates to personalized data searches utilizing social activities.

Web searching has become a main tool for Internet users to find the information they need. Researchers and engineers have made tremendous efforts in developing approaches to determine how relevant and important a webpage is with regards to a search query, so as to help users to quickly find what they are looking for. However, individuals have various backgrounds and preferences. Therefore, for the same search query, different people may expect to see different results.

Personalized searching, which customizes search results based on a user's interests, has the potential to significantly improve a user's search efficiency. Some conventional solutions extract users' interests from a variety of information sources, such as search history, emails, desktop documents, and so on. For example, a user's emails may contain unsolicited advertisements and broadcasting messages that do not match the user's interests.

BRIEF SUMMARY

In one embodiment, a method is disclosed. The method comprises receiving a search query from a user. A set of search results that satisfy the search query is received from a search engine. A user interest profile associated with the user is identified. The user interest profile comprises information associated with a set of activities performed by the user on one or more social systems. A ranking score is assigned to each result in at least a subset of search results in the set of search results based at least on the user interest profile. The subset of search results are sorted based on the ranking score that has assigned to each result in the subset of search results. The subset of search results that has been sorted is sent to the user.

In another embodiment, a system is disclosed. The system comprises an adaptive search personalization module. The adaptive search personalization module is configured for receiving a search query from a user. A set of search results that satisfy the search query is received from a search engine. A user interest profile associated with the user is identified. The user interest profile comprises information associated with a set of activities performed by the user on one or more social systems. A ranking score is assigned to each result in at least a subset of search results in the set of search results based at least on the user interest profile. The subset of search results are sorted based on the ranking score that has assigned to each result in the subset of search results. The subset of search results that has been sorted is sent to the user.

In yet another embodiment, a computer program product is disclosed. The computer program product comprises computer readable storage medium having computer readable program code embodied therewith. The computer readable program code comprising computer readable program code configured to receive a search query from a user. A set of search results that satisfy the search query is received from a search engine. A user interest profile associated with the user is identified. The user interest profile comprises information associated with a set of activities performed by the user on one or more social systems. A ranking score is assigned to each result in at least a subset of search results in the set of search results based at least on the user interest profile. The subset of search results are sorted based on the ranking score that has assigned to each result in the subset of search results. The subset of search results that has been sorted is sent to the user.

BRIEF DESCRIPTION OF THE SEVERAL VIEWS OF THE DRAWINGS

The accompanying figures where like reference numerals refer to identical or functionally similar elements throughout the separate views, and which together with the detailed description below are incorporated in and form part of the specification, serve to further illustrate various embodiments and to explain various principles and advantages all in accordance with the present invention, in which.

DETAILED DESCRIPTION

Operating Environment

Figure 1:
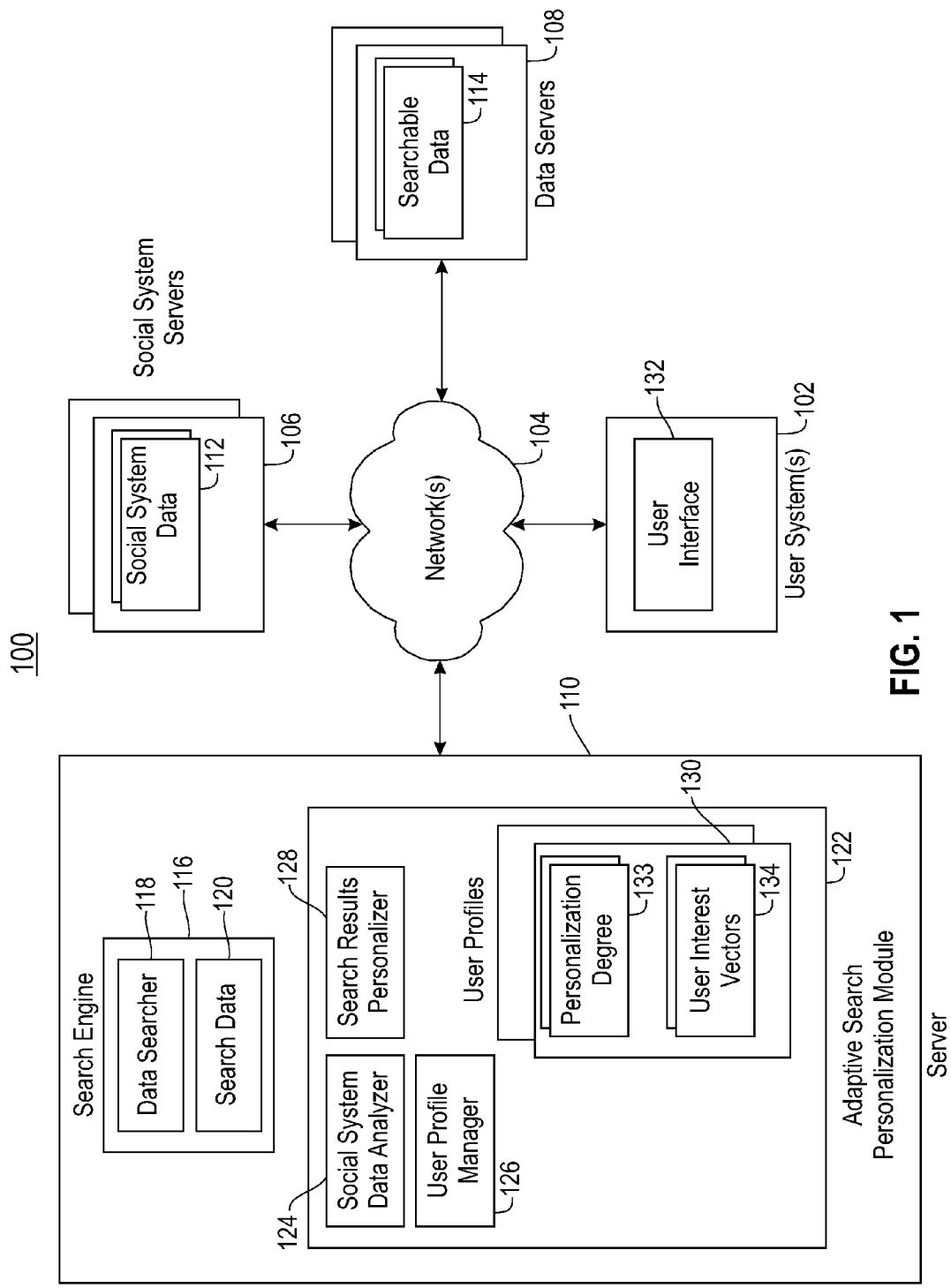
FIG. 1 is a block diagram illustrating one example of an operating environment comprising an adaptive search personalization system according to one embodiment of the present invention.

FIG. 1 shows one example of an operating environment 100 applicable to various embodiments of the present invention. The operating environment 100, in one embodiment, comprises one or more user systems 102 communicatively coupled to one or more networks 104. The user system(s) 102, in one embodiment, is a personal computer, notebook computer, workstation, PDA, cellular phone capable of browsing the Internet, and the like. The network(s) 104, according to one embodiment, comprises a LAN, WAN, World Wide Web, wireless network, or the like.

FIG. 1 also shows a plurality of servers 106, 108, 110 communicatively coupled to the network(s) 104 as well. For example, one or more social system servers 106, data servers 108, and search engine servers 110 are communicatively coupled to the network(s) 104. The social system server(s) 106 comprises social system data 112 associated with one or more social environments such as, but not limited to, a social networking environment. A separate set of social system data 112, in one embodiment, is associated with each user of a given social environment. This social system data 112 can include any type of information associated with a user's activities in the social environment. For example, information associated with a user's social network postings, blogs, mutual comments, social bookmarking, and the like are just a few examples of social system data 112. The data servers 108, in one embodiment, comprise searchable data 114 such as internet webpages, news feeds, or any other type of data that is searchable and returnable to a user in response to a query.

The search engine server 110 comprises a search engine 116. The search engine 116 comprises a data searcher 118 that searches data 114 at the data server 108. The search engine 116 also comprises the resulting search data 120, which can be stored outside of the search engine 116 as well. The search engine server 110 also comprises an adaptive search personalization module 122. The adaptive search personalization module 122 comprises a social system data analyzer 124, a user profile manager 126, and a search results generator 128. The adaptive search personalization module 122 also comprises a set of user profiles 130 generated by the user profile manager 126 based on the social system data 112 associated with that user. The adaptive search personalization module 122 and each of its components are discussed in greater detail below. It should be noted that one or more of adaptive search personalization module components can reside within the search engine 116, outside of the search engine, 116, and/or on a remote information processing system.

The user system 102, in one embodiment, comprises a user interface 132 that allows that user to interact with the search engine 116 for at least sending search queries and receiving search results in response thereto. The user interface 132 also allows the user to interact with the adaptive search personalization module 122. For example, a user is able to provide feedback on personalized search results so that the adaptive search personalization module 122 can update and improve the user interest profile 130 associated with that given user.

As will be discussed in greater below. The adaptive search personalization module 122, in one embodiment, provides a personalized search system that infers users' preferences from their activities on a variety of online social systems. Information from different social systems is integrated to provide a comprehensive picture on a user's personal interests. When answering a search query, the ranking of a webpage within search results displayed to the user, in one embodiment, is affected by the matching between its content and the current user's preferences as indicated in the user's profile (which is generated/updated based on the user's social system data). Furthermore, various embodiments of the present invention are adaptive. For example, various embodiments observe users' choices on search results and automatically adjusts the weights of different social systems during the information integration process, so as to refine the interest profile for each user accordingly.

Adaptive Search Personalization Utilizing Social System Activities

Various embodiment of the present invention provide a personalization framework that adaptively infers users' interests and preferences through their public activities on a variety of online social systems such as blogging, but not limited to, mini blogging, mutual comments, and social bookmarking. Such online activities carry valuable information about users' backgrounds and interests, which can be exploited to personalize various applications. This personalization system 122 retrieves information 112 from multiple social systems and creates a user/interest profile 130 for each user by integrating different streams of information. As an example, the following discussion personalizes the search results returned by an underlying search engine based on how well they match the query issuer's interest profile. Various embodiments also improve and update the user interest profiles 130 by learning from user feedback given through the user interface 132.

In one example, the adaptive search personalization module 122 collects data 112 from three types of social information sources, e.g., blogs, social bookmarks, and mutual tags. However, these are only examples and various embodiments of the present invention is applicable to any social information source. Blogging and social bookmarking are very popular online activities. Mutual tagging, which is often referred to as people tagging in existing literature, allows users to apply tags on each other, and tags from different users are aggregated and viewable on one's profile. Tags applied to a user usually describe the user's attributes, such as her affiliations, expertise, and the projects she has been involved in. Hence, people tags are also a quality source for studying users' backgrounds and preferences. By extracting information 112 from multiple social systems, the adaptive search personalization module 122 acquires more comprehensive information about users' interests than existing solutions that rely on a single social information source. However, the adaptive search personalization module 122 is also able to collect social information from a single source as well.

Utilizing information on social systems for personalization purposes has a number of advantages. First of all, social resources, such as blogs, mini blogs, bookmarks, and mutual tags, are often times publicly assessable. The primary goal for most people to write blogs or tag a webpage is to share their thoughts, interests, or findings with others. Hence, information from social systems has very high availability, as opposed to private information such as emails and browsing history. Second, exploring published information and resources on social systems does not violate user privacy. Since the main objective of online social activities is to share, users' published information and resources on social systems are meant to be assessed by others. Finally, very accurate information about users' interests can be learned from their online social activities. Many online social activities, such as bookmarking and blogging, are actively initiated by users (in contrast to emails, which could be passively received). Therefore, noise level, regarding user preferences, is relatively low. For example, people actively express their opinions when they write a blog, and they are unlikely to bookmark something that they do not care about.

Various embodiments provide an adaptive system. For example, the adaptive search personalization module 122 automatically adjusts the weights of different information sources as well as the degree of personalization based on past performance. For each individual user, the adaptive search personalization module 122 system identifies a setting that works best for him/her.

The following is a more detailed discussion of adaptive search personalization system briefly discussed above. The adaptive search personalization module 122, in one embodiment, extracts information 112 on users' interests from their activities on different online social systems. The social system data analyzer 124 analyzes this information 112. Based on this analysis, the user profile manager 126 generates/updates a user interest profile 130.

A user, via the user interface 132, submits a search query that is received by the adaptive search personalization module 122. Upon receiving the search query the adaptive search personalization module 122 processes the query as follows. The adaptive search personalization module 122 forwards the query to an underlying search engine 116. The search engine 116, via the data search 118, searches the data 108 at the data server 114 and returns search data 120 such as a number of webpages relevant to the query. In one embodiment, the search engine 116 associates a relevance score to each webpage in the search results; the more relevant and important a result is with regards to the query, the higher its relevance score. In another embodiment, the search results personalizer 128 assigns the relevance score to the web pages. The adaptive search personalization module 122 retrieves an interest vector 134 from the user's interest profile 130. Each element of the interest vector 134 comprises a word and an importance score indicating the degree of interest. When constructing the interest vector 134 for a user, contributions from different social information sources can carry different weights.

For each of the top n webpages (e.g., n=100) returned by the search engine 116, the adaptive search personalization module 122, via the search results personalizer 128, computes an interest-similarity score based on how well the webpage matches the user's interest vector 134. For each webpage, the adaptive search personalization module 122, via the search results personalizer 128, computes a final ranking score by combining its relevance score and its interest-similarity score. There is a personalization degree parameter 133 that determines how much the final score is affected by the interest score. The adaptive search personalization module 122, via the search results personalizer 128, sorts the webpages according to their ranking scores and returns the stored list of results to the user via the user interface 132.

In addition, the adaptive search personalization module 122, via the user profile manager 126, updates or adjustments the user profiles 132 based on the user's response to the search results. Parameters that can be adjusted include the personalization degree 133 and the weights of different social information sources. The personalization degree 133 is increased (or decreased), when personalization leads to better (or worse) search results for the user. Similarly, the weight of an information source increases (or decreases), when the information source is found to be contributing good (or bad) information about the user's interests. The goal of the adjustments is to find a set of parameters that works well for a specific user. The above aspects of the adaptive search personalization module 122 are discussed in greater detail below.

User Interest Profile

As discussed above, the adaptive search personalization module 122 generates a user interest profile 130 for a given user based on the user's interests from their activities on different online social systems. The following is a more detailed discussion on creating this user interest profile 130. A user interest profile 130, in one embodiment, is represented as (V, W, p), where V={$v_1$, ..., $v_k$} is a set of interest vectors, W={$w_1$, ..., $w_k$} is a set of real-number weights of the corresponding interest vectors (referred to as source weights), and p is a real number called the personalization degree 133. An interest vector $v_i$ stores the user's information retrieved from the $i^{th}$ social system. Each item in an interest vector $v_i$ is a pair consisting of a keyword t and a real-number importance score s. The larger the importance score s is, the more interested the user is at the keyword t. The source weights in W are used when combining the interest vectors in V into an overall interest vector for a user. The personalization degree p determines to what extent a user's interest profile 130 can affect the ranking of search results.

An interest vector 134 is created as follows. For every user, the adaptive search personalization module 122 extracts information 112 on his/her interests from a variety of online social activities. Potential social information sources include, but are not limited to, blogs, mini blogs, social bookmarks, and mutual tags. There are different ways to create an interest vector 134, depending on what the corresponding information source is. For text resources, such as blogs, the adaptive search personalization module 122 extracts the most important keywords from every blog and adds those keywords to the user's interest vector 134. The importance score of a keyword may be the number of the user's blogs that include this keyword. For tag-based resources, such as mutual tags (i.e. people tags), the tags are treated as keywords in the interest vector 134. The importance score of a keyword can be the number of people that have tagged the user with such a keyword. For example, if person A has been tagged with "biker" by five other people, then "biker" is a keyword with score five in person A's interest vector 134 on people tagging. Certain social information includes both texts and tags. For instance, social bookmarks include bookmarked webpages and the tags applied to those webpages. The adaptive search personalization module 122 combines the previous two methods to create interest vectors for such kinds of resources. For each user, the adaptive search personalization module 122 normalizes the importance scores in his/her interest vectors into [0, 1]. This is to facilitate the combination of multiple interest vectors into an overall interest vector for a user.

As stated earlier, every user's interest profile includes multiple interest vectors, one from each social information source. To get a comprehensive picture of a user's interests, the adaptive search personalization module 122 combines those individual interest vectors into an overall interest vector for the user. Assume that there are k interest vectors in the user's profile 130. Let $T_i$ be the set of keywords in the $i^{th}$ (i∈[1, k]) interest vector 134, and let T be the set of keywords of the overall interest vector. Therefore, T is the union of all $T_i$. For every word t in T, its importance score s(t) in the overall interest vector is computed as s(t)=$\Sigma_{i=1}^{k}$ $s_i(t) \cdot w_i$, where $s_i(t)$ is the importance score of t in the $i^{th}$ interest vector ($s_i(t)$=0, if t is not in $T_i$) and $w_i$ is the current source weight of the $i^{th}$ interest vector 134. In other words, those interest vectors are combined with different weights.

As mentioned above, all users are not equally engaged in all the online social activities that are considered. Therefore, when combining individual interest vectors for a user, different interest vectors carry different weights. For example, if a user has written a lot of blogs but rarely bookmarks anything, the adaptive search personalization module 122 attaches more importance to the interest vector 134 constructed from his/her blogs than the one from his/her bookmarks. The reason is that, a more abundant information source tends to carry more accurate and comprehensive information about the user's preferences. Therefore, in one embodiment, the adaptive search personalization module 122 assigns different initial source weights to different interest vectors, and adjusts the source weights over time according to how well each interest vector 134 contributes to finding what the user really wants.

For efficiency consideration, the adaptive search personalization module 122 adopts a simple approach on source weight initialization. The adaptive search personalization module 122 initializes the weights of various information sources by assigning a weight proportional to the total amount of information provided by the corresponding information source. For instance, if the user has 100 blogs and 50 bookmarks, then the initial source weight of the blog vector can be twice of the initial source weight of the bookmark vector. This adjustment of source weights greater detail below.

The adaptive search personalization module 122, in one embodiment, also updates user interest vectors. Users will continue using the online social systems and generate more data after the adaptive search personalization module 122 has created interest profiles for them. In order to stay updated, the adaptive search personalization module 122 can periodically crawl new data from social systems. To integrate new information into a user's interest profile, the adaptive search personalization module 122 adds new keywords to the corresponding interest vector 134 and/or updates the importance scores of existing keywords in it. There is no expensive computation or re-training for profile updates in this embodiment. Furthermore, if a new social information source becomes available, the adaptive search personalization module 122 can add a new interest vector 134 to the interest profile of each user and make use of the new data. Finally, the adaptive search personalization module 122 gives higher priority to new data by decaying old data periodically, since new information better represents the current interests of users.

With the growing popularity of social networks, more and more people are actively involved in one or more online social systems. Taking advantages of new information from social activities enables the adaptive search personalization module 122 to maintain an updated interest profile for almost everyone, including those users who do not use the search system very often.

The following is a more detailed discussion on personalizing search results. Upon receiving a search query from a user, the adaptive search personalization module 122 forwards the query to the underlying search engine 116. The search engine 116, via the data searcher 118, returns a list of webpages 120 for the query. The search engine 116 also associates a relevance score to each returned webpage, such that webpages which are ranked higher (i.e. those considered to be more relevant and important to the query) have higher relevance scores. The relevance scores are normalized into [0, 1]. In case the underlying search engine 116 does not return relevance scores for search results, the adaptive search personalization module 122 estimates a relevance score based on the ranking of the results. For example, the adaptive search personalization module 122 can use $1/(1+k)$ as the relevance score of the $k^{th}$ webpage in the result list.

The adaptive search personalization module 122 then combines the individual interest vectors in the user's profile 130 to acquire an overall interest vector for the user, using the embodiment(s) discussed above. For each of the top m webpages (say, m=100) returned by the underlying search engine 116, the adaptive search personalization module 122 computes an interest-similarity score based on how well the webpage matches the overall interest vector. In one embodiment, the interest-similarity score is proportional to the cosine similarity between the word vector of the webpage (or the snippet of the webpage returned by the search engine) and the overall interest vector of the user. Note that the adaptive search personalization module 122 computes an interest-similarity score only for those high ranked results so as to make our personalized process more efficient. Lower ranked results have low relevance scores and are thus unlikely to be ranked high even if they get relatively high interest scores. Furthermore, it is undesirable to bring results that are not very relevant to the search query to the front of the list, even if they match the user's interests well.

The adaptive search personalization module 122 then computes a final ranking score for each of the top m webpages. Let $g_r(x)$, $g_i(x)$, and $g_f(x)$ be the relevance score, the interest-similarity score, and the final ranking score of webpage x, respectively. Therefore, $$g_f(x) = g_r(x) \times (1-p) + g_i(x) \times p$$

where p is the personalization degree 133 in the user's profile. A user's personalization degree 133 can be initialized to a value in [0, 1] (e.g., 0.5) and is adjusted over time, depending on whether the current personalization setting is effective for the user. Different users may end up having different personalization degrees. A higher personalized degree leads to larger influence of the user's interest profile on search results. Finally, the top m webpages are re-ranked based on their final ranking scores, and the new list of sorted results is returned to the user.

In one embodiment, the adaptive search personalization module 122 adaptively adjusts parameters W and p in interest profiles so as to better serve each user. For example, after answering a search query, the adaptive search personalization module 122 observes the user's reactions and determines which results are useful to the user. A straightforward approach is to mark those results clicked by the user as useful. In practice, the user sometimes needs to go over a few webpages before finding what she really wants. But most of the time, links that are clicked are more relevant to what the user is looking for than those that are not. However, other methods of determining which webpages were useful to the user are also applicable to embodiments of the present invention.

With respect to the personalization degree 133, for some users, their interest profiles correctly represent their preferences, and the adaptive search personalization module 122 is able to rank what they are looking for high in the result lists for most search queries. In those cases, it may be desirable to increase the personalization degree 133 so as to bring more interesting webpages to the front for future search queries. However, when the adaptive search personalization module 122 determines that a user's interest profile is affecting the search results more than it should, the system may decrease the personalization degree 133 for the user.

To make adjustment after answering a query, the adaptive search personalization module 122 evaluates the effectiveness of personalization with the current personalization degree 133. Let $S_u$ be the set of search results that are actually clicked by the user u. Also, let $L_g$ be the original list of results returned by the underlying search engine and $L_p$ be the final list of results returned by the adaptive search personalization module 122. The adaptive search personalization module 122 computes two matching scores, one between $L_g$ and $S_u$, and the other between $L_p$ and $S_u$. The adaptive search personalization module 122 checks how many results in the top x spots of $L_g$ (or $L_p$) are included in $S_u$, and it gives more weight to those elements ranked higher in the list. More specifically, the adaptive search personalization module 122 uses, in one embodiment, the Normalized Discounted Cumulative Gain (NDCG) as the matching score between list L and set S:

$$NDCG(L, S) = Z_x \sum_{i=1}^{x} (2^{r_i} - 1)/\log_2(i+1)$$

where $r_i$ is 1 if the $i^{th}$ element of L is in S and $r_i$ is 0 otherwise. $Z_x$ is chosen so that a perfect ranking has NDCG value of 1.

Let $p^0_u$ be the current value of the personalization degree 133 of user u. The adaptive search personalization module 122 computes the new value $p^1_u$ of personalization degree 133 as follows.

$$p^1_u = p^0_u - p^0_u \cdot \alpha \cdot \beta \text{ when } m(L_p, S_u) < m(L_g, S_u)$$

$$p^1_u = p^0_u + (1-p^0_u) \cdot \alpha \cdot \beta \text{ when } m(L_p, S_u) > m(L_g, S_u)$$

where $\alpha$ is a real-number parameter controlling adjustment speed and $\beta = |NDCG(L_P, S_u) - NDCG(L_g, S_u)|/|NDCG(L_P, S_u) + NDCG(L_g, S_u)|$. Intuitively, the larger the difference between $NDCG(L_p, S_u)$ and $NDCG(L_g, S_u)$, the faster the personalization degree 133 is adjusted (due to larger $\beta$).

With respect to adjusting source weights, different people may use online social systems differently. As discussed above, interest vectors from various information sources are combined with different weights and initial weights of different information sources are estimated based on the total amount of information provided by a source. However, the initial values may not be accurate, and moreover, new data from those information sources can be added to the user's profile over time. Therefore, the adaptive search personalization module 122 is adaptive. For example, the adaptive search personalization module 122 automatically adjusts the weights of different information sources in a user's profile.

After answering a search query from user u, let $S_u$ be the set of search results that are actually clicked by u. The adaptive search personalization module 122 adjusts the weight of an information source according to how well its interest vector 134 matches the webpages in $S_u$ (recall that a user's interest profile maintains an interest vector 134 for each information source). Let $v_i$ be the interest vector of the $i_{th}$ information source, the similarity score between $v_i$ and $S_u$ is computed as $$h(v_i, S_u) = \sum_{s \in Su} \cos(v_i, s),$$

where $\cos(v_i, s)$ is the cosine similarity between interest vector $v_i$ and the word vector of webpage s.

The adaptive search personalization module 122 the computes the average value h of the matching scores of the interests vectors in u's profile. The adaptive search personalization module 122 increases the weight $w_i$ of the $i^{th}$ information source, if $h(v_i, S_u) > h$; the adaptive search personalization module 122 decreases $w_i$, if $h(v_i, S_u) < h$. Let $w^0_i$ be the current weight of the $i^{th}$ information source in u's profile. The adaptive search personalization module 122 computes the new value $w^1_i$ as follows.

$$w^1_i = w^0_i - w^0_i \cdot \alpha' \cdot \beta' \text{ when } h(v_i, S_u) < h$$

$$w^1_i = w^0_i + (1-w^0_i) \cdot \alpha' \cdot \beta' \text{ when } h(v_i, S_u) > h$$

where $\alpha'$ is a real-number parameter controlling adjustment speed and $\beta' = |h(v_i, S_u) - h|/h$. Intuitively, the further the $h(v_i, S_u)$ deviates (either being larger or smaller) from average value, the faster the source weight $w_i$ is adjusted (due to larger $\beta'$).

As can be seen from the above discussion, various embodiments of the present invention provide a personalization framework that infers users' preferences from their activities on a variety of online social systems. Search results are personalized based on a user profile created from a user's activities at the social systems. One or more embodiments are adaptive in that they observe users' choices on search results and automatically adjusts parameters such as personalization degree 133 and the weights of different information sources so as to better meet the user's needs.

It should be noted that the embodiments discussed above are not limited to web/Internet searches. For example, these embodiments can be easily generalized to support other applications, such as selective information distribution, news feed filtering, and article recommendation. In these embodiments, the adaptive search personalization module 122 infers a user's interests on various topics and on people from a variety of online social activities, including blogging, social bookmarking, people tagging, etc. The adaptive search personalization module 122 creates and maintains an interest profile for every user. The adaptive search personalization module 122 provides the user interest profiles to a variety of applications, so that those applications can take advantages of users' interests (on topics and on people) to personalize/customize their services and/or results. The adaptive search personalization module 122 takes implicit or explicit user feedback from applications and update the corresponding user interest profiles.

With respect to user profile creation and maintenance in these generalized embodiments, the embodiments discussed above can be used to infer a user's interest on various topics. Also, a user's interests on other people can be included in a user's general interest profile. For example, it is possible to infer user's social connection with others by mining social information sources such as people-tagging, blogs, Activities, organizational report chains and even publication co-authoring. To perform the inferring, the adaptive search personalization module 122 maintains a vector 134 on social connections for each information source and then combines individual vectors into an overall vector. There are different ways to create a connection vector, depending on what the corresponding information source is. For example, in people-tagging, the strength of connection between Alice and Bob may be the number of times the two users tag each other. For another example, in blogs, the strength of connection between Alice and Bob may be the sum of the number of times Alice comments on Bob's blogs, and vice versa. The approach to combine individual connection vectors in a user profile into an overall connection vector is identical to the approach for combining interest vectors.

With respect to adjustment based on user feedback in the generalized embodiments, the embodiments discussed above can be used as well with the exception of the concrete forms of user feedback. For example, in a search system, the adaptive search personalization module 122 can determine relevance by observing which search results are clicked by the user. The adaptive search personalization module 122 can employ different metrics on other systems. For example, in a selective information distribution system, the adaptive search personalization module 122 can observe which distributed messages are actually read by a receiver and/or how the receiver rates the messages. For another example, in a recommendation system, the adaptive search personalization module 122 can observe which recommended items are actually taken by the target user. Once an application determines which messages or items are considered useful by the target user, the adaptive embodiments discussed above can be employed to adjust the corresponding user's interest profile.

With respect to providing the user interest profiles to a variety of applications, this embodiment is application-dependant, as different applications may personalize their services/results in different ways. In the embodiments discussed above, an approach to personalize search results was discussed, which can be viewed as an example on application personalization. Other applications can be personalized with the provided user interest profiles in a similar way. In the following, two examples on personalizing applications other than search are discussed.

The first example is a Selective Information Distribution example. Assume that a sender would like to distribute a message (e.g., a call-for-participants) to people who may be interested in the message. A challenge is to automatically find out who may be interested to the message, as manually selecting recipients is time-consuming. With the user interest profiles provided by our system, such a task can be easily automated. In this embodiment, the sender selects a distribution scope. Example scopes are "everyone in the company", "everyone with the same manager as the sender", "everyone in branch XYZ", etc. The message distribution system computes a matching score between the message and the interest profile of every user in the selected distribution scope. The higher the matching score, the more likely a user is interested in the message. One example of computing the matching score is to compute the cosine similarity between the keyword vector of the message and the keywords in the interest profile of a user. Furthermore, the strength of connections between the sender and the potential receiver can be taken into account when computing the matching score. For example, a bonus may be added to the matching score, if the sender and the potential receiver are closely connected. The message distribution system delivers the message to those users whose matching scores are higher than a certain threshold (say, higher than the average score in the distribution scope, or higher than 75% of the scores, etc).

The second example is with respect to News Recommendation. A news system would like to recommend a small number of news articles to individual subscribers every day. The challenge is to determine which articles may be interesting to a certain subscriber. With the user interest profiles provided by our system, such a task can be easily achieved. Given a pool of news articles for the day, the news system computes a matching score between each article and the interest profile of a target subscriber. The higher the matching score, the more likely a user is interested in the message. One example of computing the matching score is to compute the cosine similarity between the keyword vector of an article and the keywords in the interest profile of the subscriber. The top k articles with the highest matching scores with respect to the target subscriber are recommended to the subscriber.

As will be appreciated by one skilled in the art, aspects of the present invention may be embodied as a system, method, or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

Operational Flow Diagrams

Referring now to FIGS. 2-6, the flowcharts and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

Figure 2:
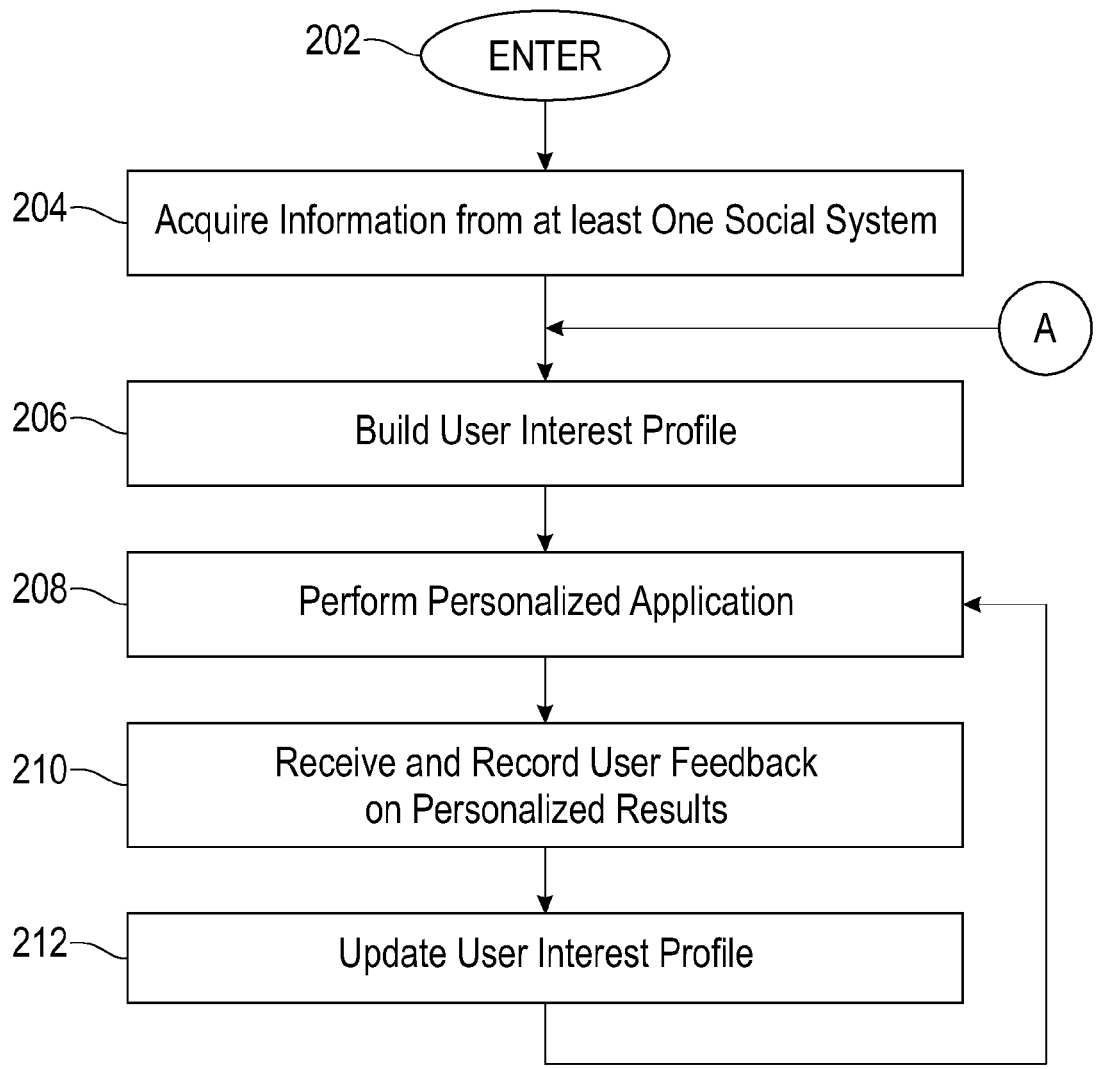
FIG. 2 is an operational flow diagram illustrating one example of a process for adaptively personalizing search results based on a user's activities in one or more on-line social systems according to one embodiment of the present invention.

FIG. 2 is an operational flow diagram illustrating one overview of a process for adaptively personalizing search results based on a user's activities in one or more on-line social systems. The operational flow of FIG. 2 starts at step 202 and flows directly into step 204. The adaptive search personalization module 122, step 204, acquires information 112 from at least one social system. The adaptive search personalization module 122, step 206, builds a user interest profile 130. The adaptive search personalization module 122, step 208, receives and records user feedback on personalized results. The adaptive search personalization module 122, at step 212, updates the user interest profile 130. The control flow then returns to step 208.

Figure 3:
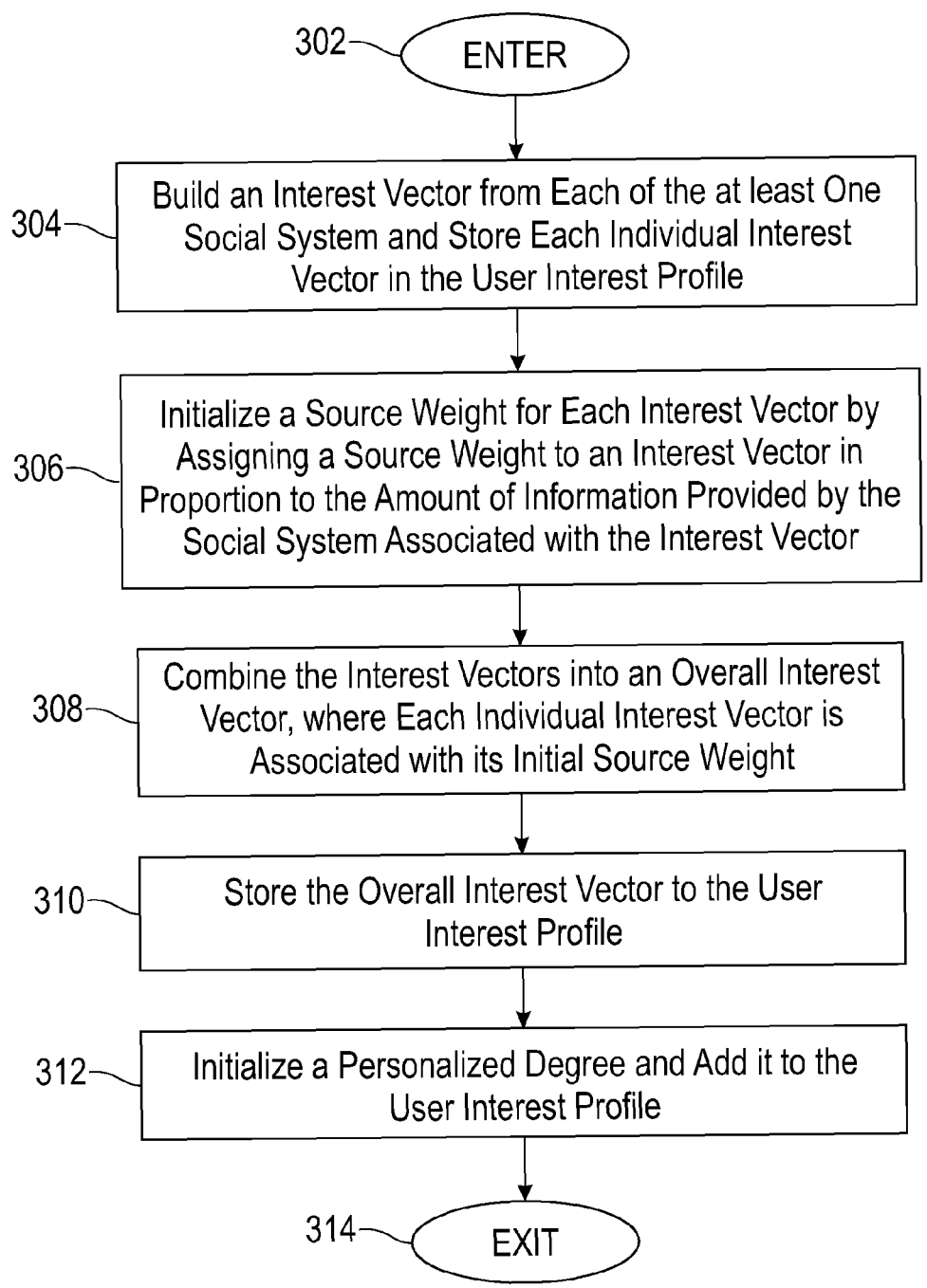
FIG. 3 is an operational flow diagram illustrating one example of a process for generating a user interest profile according to one embodiment of the present invention.

FIG. 3 is an operational flow diagram illustrating an overview of a process for generating a user interest profile. The operational flow of FIG. 3 starts at step 302 and flows directly into step 304. The adaptive search personalization module 122, step 304, builds an interest vector 134 from each of the at least one social systems and stores each individual interest vector 134 in the user interest profile 130. The adaptive search personalization module 122, step 306, initializes a source weight for each interest vector 134 by assigning a source weight to an interest vector 134 in proportion to the amount of information provided by the social system associated with the interest vector 134. The adaptive search personalization module 122, step 308, combines the interest vectors into an overall interest vector, where each individual interest vector 134 is associated with its initial source weight. The adaptive search personalization module 122, step 310, stores the overall interest vector to the user interest profile. The adaptive search personalization module 122, step 312, initializes a personalized degree and adds this personalized degree to the user interest profile 130. The control flow then exits at step 314.

Figure 4:
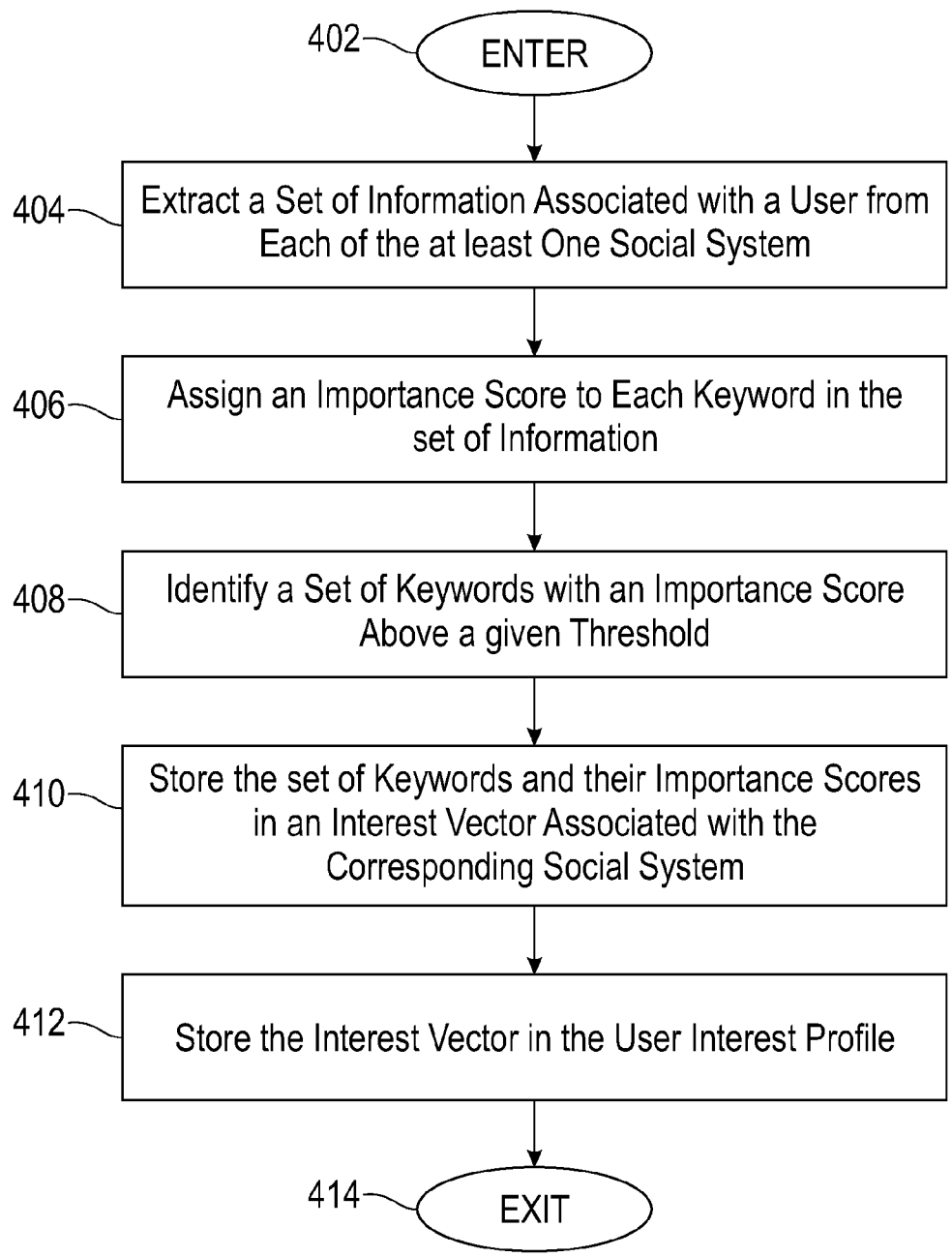
FIG. 4 is an operational flow diagram illustrating one example of a process for generating a user interest vector according to one embodiment of the present invention.

FIG. 4 is an operational flow diagram illustrating one example of a process for generating a user interest vector 134. The operational flow of FIG. 4 starts at step 402 and flows directly into step 404. The adaptive search personalization module 122, step 404, extracts a set of information 112 associated with a user from each of the at least one social systems. The adaptive search personalization module 122, step 406, assigns an importance score to each keyword in the set of information 112. The adaptive search personalization module 122, step 408, identifies a set of keywords within an importance score above a given threshold. The adaptive search personalization module 122, step 410, stores the set of keywords and their importance scores in an interest vector 134 associated with the corresponding social system. The adaptive search personalization module 122, step 412, stores the interest vector 134 in the user interest profile 140. The control flow then exits at step 414.

Figure 5:
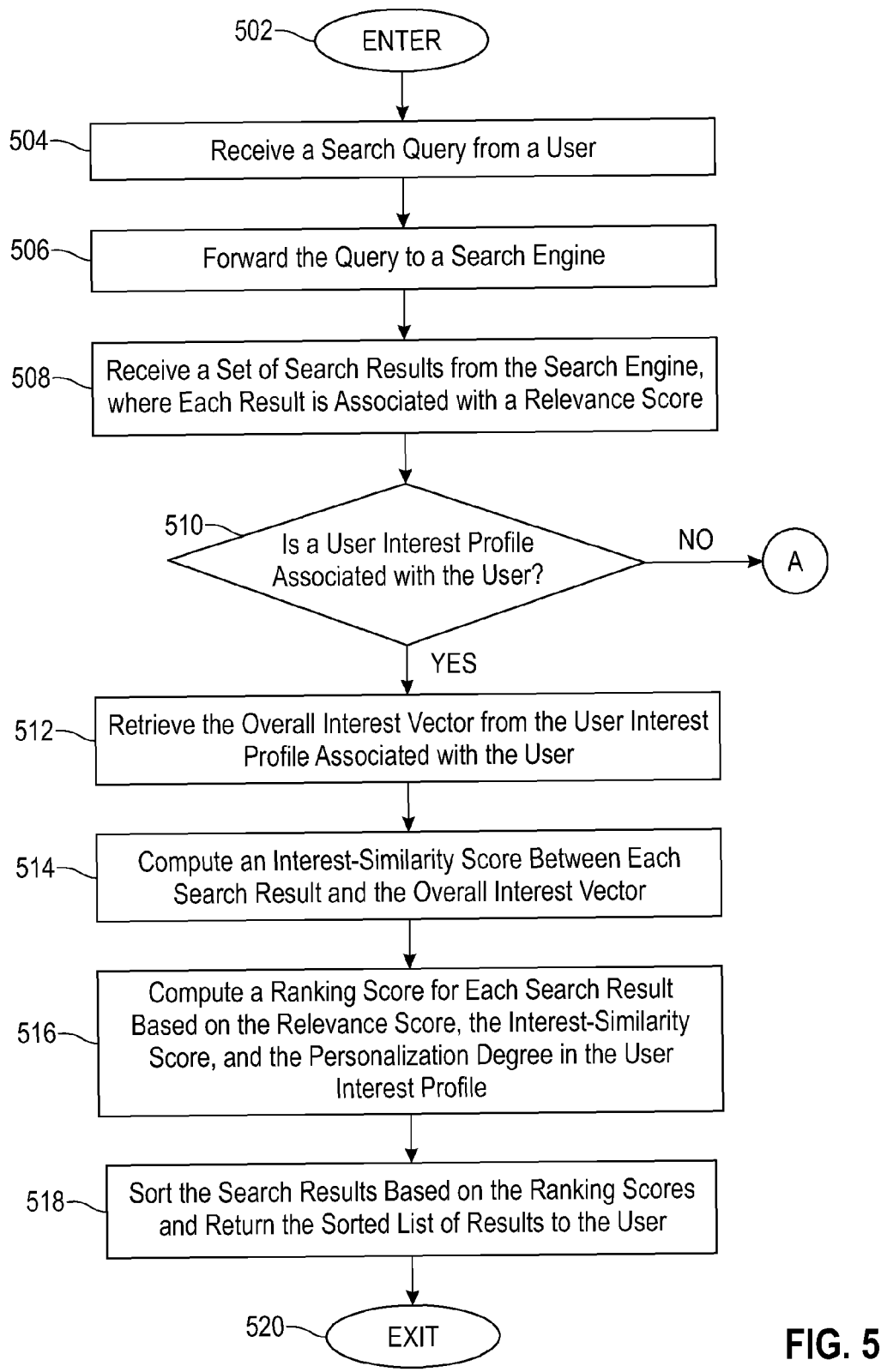
FIG. 5 is an operational flow diagram illustrating a more detailed process for personalizing search results based on a user's activities in one or more on-line social systems according to one embodiment of the present invention.

FIG. 5 is an operational flow diagram illustrating a more detailed process for personalizing search results based on a user's activities in one or more on-line social systems. The operational flow of FIG. 5 starts at step 502 and flows directly into step 504. The adaptive search personalization module 122, step 504, receives a search query from a user. The adaptive search personalization module 122, step 506, forwards the query to a search engine 116. The adaptive search personalization module 122, step 508, receives a set of search results 120 from the search engine 116, where each result is associated with a relevance score.

The adaptive search personalization module 122, step 510, determines if a user interest profile is associated with the user. If the result of this determination is negative, the control flows to entry point A in FIG. 2. If the result of this determination is positive, the adaptive search personalization module 122, step 512, retrieves the overall interest vector from the user interest profile 130 associated with the user. The adaptive search personalization module 122, step 514, computes an interest-similarity score between each search result and the overall interest vector. The adaptive search personalization module 122, step 516, computes a ranking score for each search result based on the relevance score, the interest-similarity score, and the personalization degree 133 in the user interest profile 130. The adaptive search personalization module 122, step 518, sorts the search results based on the ranking scores and return the sorted list of results to the user.

Figure 6:
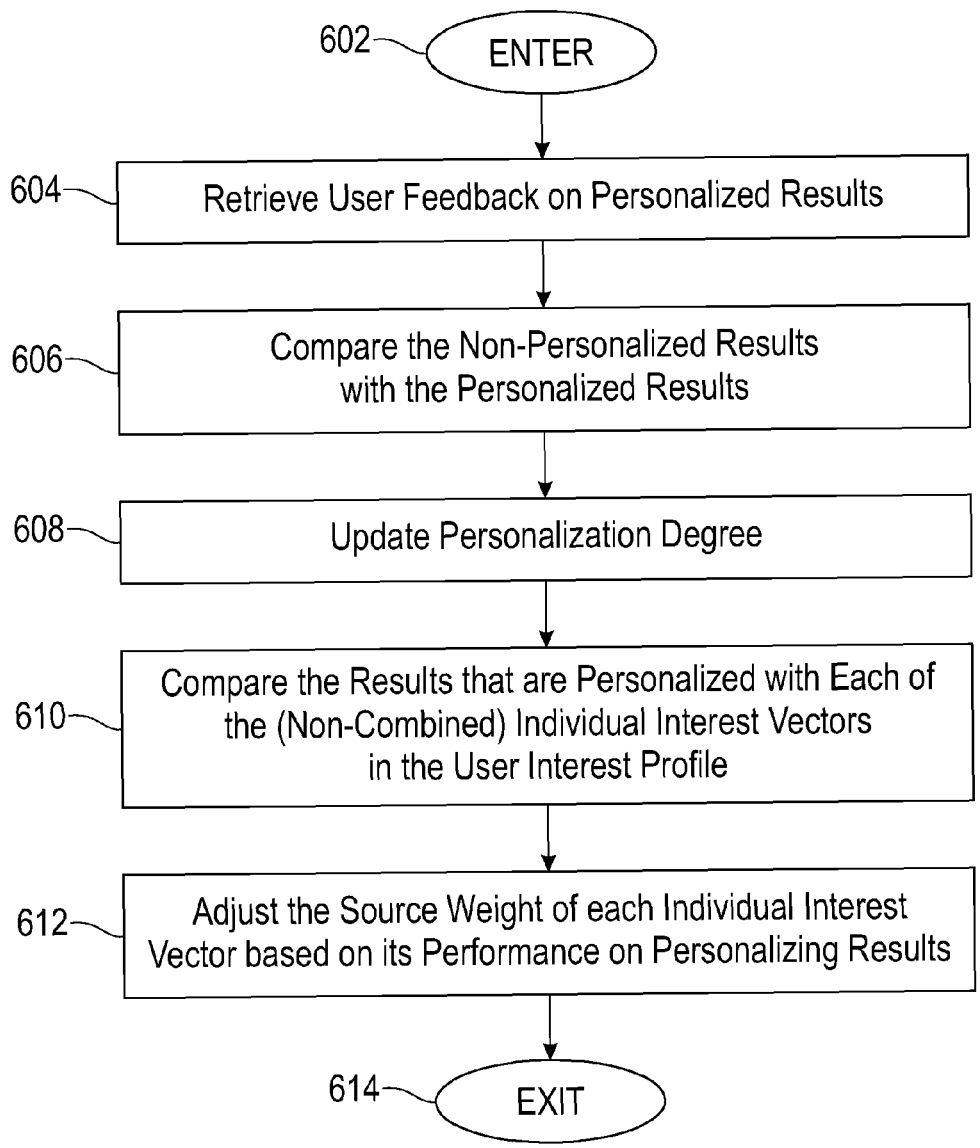
FIG. 6 is an operational flow diagram illustrating one example of a process for updating a user interest profile according to one embodiment of the present invention.

FIG. 6 is an operational flow diagram illustrating one example of a process for updating a user interest profile. The operational flow of FIG. 6 starts at step 602 and flows directly into step 604. The adaptive search personalization module 122, step 604, retrieves user feedback on personalized results. The adaptive search personalization module 122, step 606, compares the non-personalized results with the personalized results. The adaptive search personalization module 122, step 608, updates the personalization degree 133. The adaptive search personalization module 122, step 610, compares the results that are personalized with each of the (non-combined) individual interest vectors in the user interest profile 610. The adaptive search personalization module 122, step 612, adjusts the source weight of each individual interest vector 134 based on its performance on personalizing results. The control flow then exits at step 614.

Information Processing System

Figure 7:
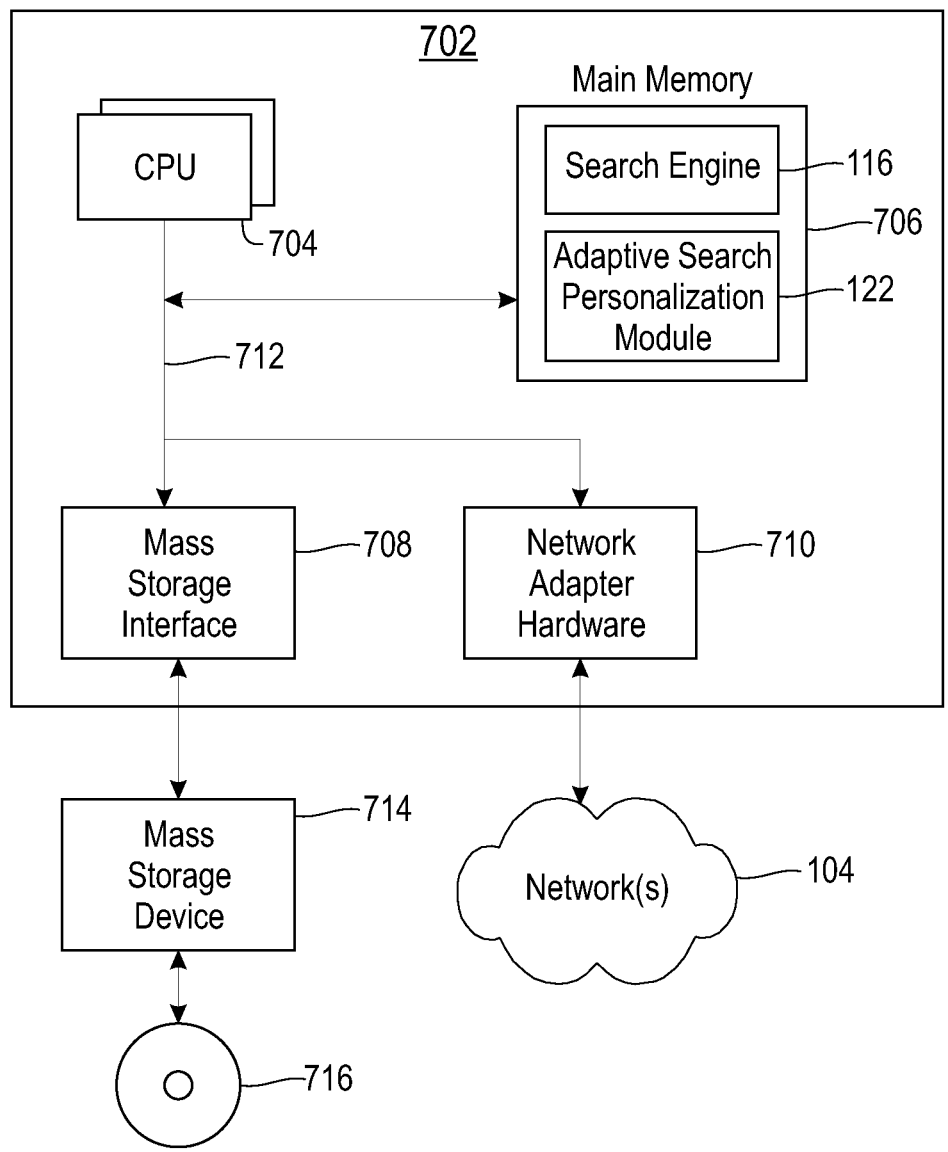
FIG. 7 is a block diagram illustrating a detailed view of an information processing system according to one embodiment of the present invention.

FIG. 7 is a block diagram illustrating a more detailed view of an information processing system 700, such as the search engine server 106, that can be utilized in the operating environment 100 discussed above with respect to FIG. 1. The information processing system 700 is based upon a suitably configured processing system adapted to implement one or more embodiments of the present invention. Similarly, any suitably configured processing system can be used as the information processing system 700 by embodiments of the present invention.

The information processing system 700 includes a computer 702. The computer 702 has a processor(s) 704 that is connected to a main memory 706, mass storage interface 708, and network adapter hardware 710. A system bus 712 interconnects these system components. The main memory 706, in one embodiment, comprises the adaptive search personalization module 122 (or at least a portion of the adaptive search personalization module 122) discussed above. The main memory can also include the search engine 116 as well.

Although illustrated as concurrently resident in the main memory 706, it is clear that respective components of the main memory 706 are not required to be completely resident in the main memory 706 at all times or even at the same time. In one embodiment, the information processing system 700 utilizes conventional virtual addressing mechanisms to allow programs to behave as if they have access to a large, single storage entity, referred to herein as a computer system memory, instead of access to multiple, smaller storage entities such as the main memory 706 and data storage device 716. Note that the term "computer system memory" is used herein to generically refer to the entire virtual memory of the information processing system 706.

The mass storage interface 708 is used to connect mass storage devices, such as mass storage device 714, to the information processing system 700. One specific type of data storage device is an optical drive such as a CD/DVD drive, which may be used to store data to and read data from a computer readable medium or storage product such as (but not limited to) a CD/DVD 716. Another type of data storage device is a data storage device configured to support, for example, NTFS type file system operations.

Although only one CPU 704 is illustrated for computer 702, computer systems with multiple CPUs can be used equally effectively. Embodiments of the present invention further incorporate interfaces that each includes separate, fully programmed microprocessors that are used to off-load processing from the CPU 704. An operating system (not shown) included in the main memory is a suitable multitasking operating system such as any of the Linux, UNIX, Windows, and Windows Server based operating systems. Embodiments of the present invention are able to use any other suitable operating system. Some embodiments of the present invention utilize architectures, such as an object oriented framework mechanism, that allows instructions of the components of operating system (not shown) to be executed on any processor located within the information processing system 700. The network adapter hardware 710 is used to provide an interface to a network 104. Embodiments of the present invention are able to be adapted to work with any data communications connections including present day analog and/or digital techniques or via a future networking mechanism.

Although the exemplary embodiments of the present invention are described in the context of a fully functional computer system, those of ordinary skill in the art will appreciate that various embodiments are capable of being distributed as a program product via CD or DVD, e.g. CD 716, CD ROM, or other form of recordable media, or via any type of electronic transmission mechanism.

Evaluation

The inventors have implemented the adaptive search personalization embodiments discussed above and performed experiments on real-world data to evaluate its performance. There were four objectives in these experiments. The first objective was to check whether the adaptive search personalization embodiments improve search quality over its underlying non-personalized search engine. The second objective was to see how the amount of available data on social systems affects the performance of various embodiments. In other words, whether one or more embodiments perform better on users who are highly active on social systems (and thus has a richer interest profile) than those who are less active. The third objective was to evaluate if using the information from multiple online social systems is better than relying on the information from a single source with regards to search personalization. The fourth objective was to determine whether the adaptive embodiments improved performance.

The inventors tested the personalized search embodiment(s) discussed above using data from three types of online social activities, which were blogs, social bookmarks, and mutual tags (also called people tags). The experimental data was collected from a large-scale social computing system that contains a blogging sub-system referred to as "first social system" a social book-marking system referred to as "second social system", and a user profiling system referred to as "third social system", which are the anonymized names of the actual systems used for blind review purposes. The data set from second social system consists of more than 420,000 bookmarks contributed by over 6,000 users from worldwide. The profiling system third social system supports mutual tagging which allows users to tag each other. In the third social system data set, more than 53,000 users have been tagged with over 170,000 tags.

Not every user is involved in all the three types of online social activities we considered. In the inventors' experiments, the chose those users who have written at least 10 blogs, received no less than 10 people tags, and bookmarked 20 webpages or more. There were 208 users in the data sets that met the selection criteria. The selection contains users who are very active in online social systems as well as those who are less active. On average, each of the selected users has 26 people tags, 129 blogs, and 391 bookmarks. The maximum numbers of people tags, blogs, and bookmarks among the selected users are 137, 2635, and 5050, respectively.

Common methods to evaluate personalized search approaches include user interviews and search log examination. While users' opinions are crucial to personalization solutions, conducting study with a large number of people is oftentimes expensive and time-consuming; not to mention that those 208 users meeting our selection criteria are from all over the world. Examining search logs to compare personalized search results with non-personalized results is an effective approach. However, in practice, acquiring search logs are difficult for most researchers, because search engine providers do not normally release such data. Furthermore, user identity information would be needed so as to match the search logs with the user interest profiles we build from online social systems.

Getting search logs with identity information were not used due to privacy concerns. Therefore, the inventors utilized other evaluation methods. The major challenge to evaluate a personalized search system is to determine which results are considered useful and relevant to a search query by a specific user. Here, the inventors employed the evaluation method proposed in [17] (which is hereby incorporated by reference in its entirety), which uses people's bookmarks and tags to represent their opinions. The intuition is that, if a user u book-marked a webpage and tagged the webpage with a word t, then u must consider the webpage useful and relevant to t. A query can be issued comprising the keyword t on behalf of u, and then a check is performed to determine whether those webpages tagged with t by u are ranked high in the result list returned by the personalized search system. A drawback of this evaluation method is the potentially high false negative rate: a webpage not being tagged with t may still be considered useful by u. In spite of the drawback, this method still allowed the inventors to obtain a relevant and useful performance metric for the personalized search system. Furthermore, the method has a couple of advantages that made it a good choice. First, this evaluation method only refers to users' social bookmarks and tags, which are easy to obtain (as opposed to search logs). Second, since user participation is not required in the evaluation process, the inventors were able to run as many experiments as needed to achieve the evaluation objectives given above. The personalized search system was tested over a large number of queries in various settings.

The inventors tested the 208 chosen users one by one. For each user, 25% of his/her bookmarks from second social system together with his/her blogs and people tags were used to create his/her interest profile; the other 75% of the user's bookmarked webpages in second social system (which do not overlap with the 25% bookmarks used in profile building), together all the webpages bookmarked by other second social system users, were used as the testing corpus. For the $i^{th}$ user $u_i$, the inventors randomly selected 30 words $u_i$ has applied as tags on his/her bookmarks. For each of those 30 words, a search query comprising the word was issued on behalf of $u_i$. Assume that a search query comprises a word t. Let $L^t[1,k]$ be the list of top k results returned by the search system and $S_t$ be the set of webpages that have been tagged with t by $u_i$. The inventors then computed the recall@k as $|L_t[1,k] \cap S_t|/|S_t|$. To measure the performance of the search system with regards to $u_i$, the inventors computed the average value of the recall over the 30 search queries issued for $u_i$. The improvement percentage of search approach A over approach B for $u_i$ is computed as $(r_a-rb)/rb$, where $r_a$ and rb are the average recall of approaches A and B, respectively. To evaluate the overall performance of the search system, the inventors computed the average recall value over the tested users. The average improvement percentage against a baseline search solution over tested users may also be computed. Finally, when comparing two search solutions, a solution wins for a user, if it has a higher average recall for the user's queries than the other solution.

The following discussion presents the experimental results. For convenience, personalized search embodiments are referred to as "Personalized" and the underlying non-personalized system is referred to as "Normal".

Personalization vs. Non-personalization. The first set of experiments were designed to check whether Personalized improves the search quality over Normal. Experimental results are presented in Table 1 below and visualized in FIG. 8.

TABLE 1

| Top x Search Results | | 1 | 5 | 10 | 15 | 20 | 25 |
| --- | --- | --- | --- | --- | --- | --- | --- |
| Recall | Non-Personalized | 0.034 | 0.128 | 0.214 | 0.273 | 0.321 | 0.358 |
| | Personalized | 0.050 | 0.188 | 0.302 | 0.390 | 0.457 | 0.515 |
| Improvement Percentage | Non-Personalized | 0.0 | 0.0 | 0.0 | 0.0 | 0.0 | 0.0 |
| | Personalized | 26.5 | 49.5 | 50.8 | 59.1 | 61.1 | 61.9 |
| Number of Wins | Non-Personalized | 22 | 33 | 39 | 35 | 40 | 42 |
| | Personalized | 67 | 101 | 118 | 117 | 132 | 134 |

Figure 8:
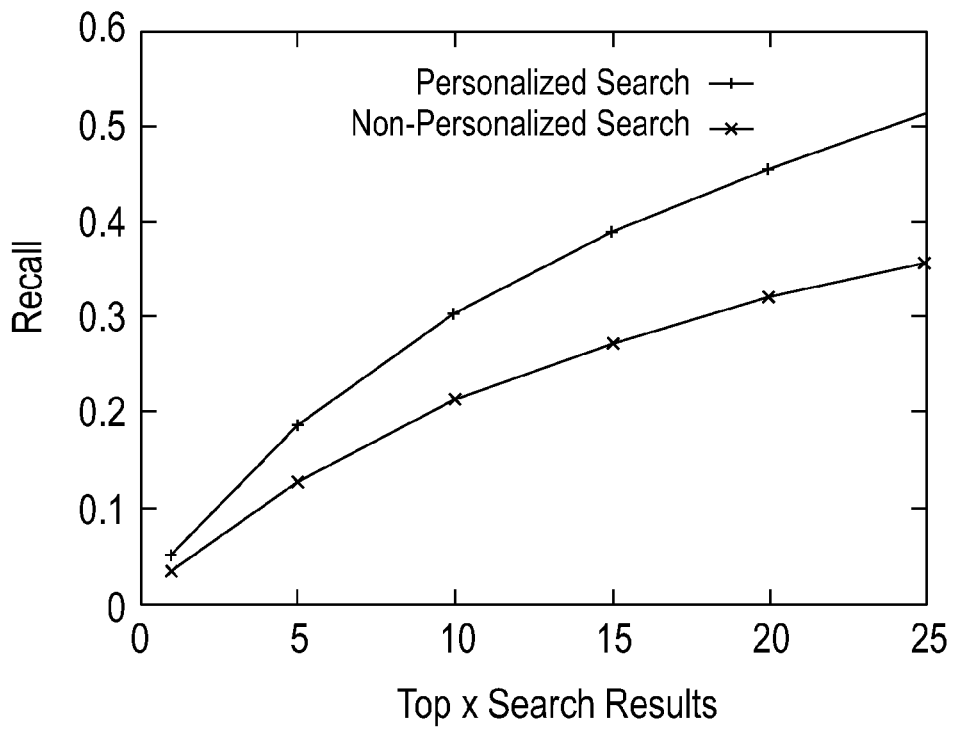
FIG. 8 is a graph illustrating a performance comparison between embodiments of the present invention and conventional systems.

As can be seen from FIG. 8, Personalized outperformed Normal with regards to recall in all cases. On average, Personalized's recall was 26% to 61% higher than that of Normal, depending on how many results were consider for each query. In particular, when more than 5 returned results were considered, Personalized's improvement percentage over Normal was larger than 50%.

In addition to comparing recall, the inventors wanted to also know if Personalized outperforms Normal for most users. The numbers of wins for Personalized and Normal are given in Table 1 above. When at least the top 10 results for each query were considered, Personalized outperformed Normal on 117 to 134 (or 56% to 64%) users, while Normal outperformed Personalized on around 40 (or 19%) users; for about 20% of the tested users, Personalized and Normal had roughly the same performance. This indicates that, for most users, it is beneficial to personalize their search results. In general, the experimental results demonstrated that the personalized search embodiments are effective in identifying individual users' preferences and adjusting search results accordingly.

Active users vs. Less active users. The goal of the second set of experiments was to evaluate the performance of Personalized for users with different amounts of data on social systems. For each of the 208 selected users, the inventors computed the sum of the numbers of his/her social activities (i.e. the number of blogs, the number of bookmarks, and the number of people tags). The inventors chose the 35 users with the largest sums of activities and named the group High. In other words, High contained those users who are most active on social systems. Also, the inventors selected the 35 users with the smallest sums and named the group Low. Finally, the inventors chose 35 users with sums around the average value over the 208 users and named the group Medium. The average sums of social activities of users in High, Medium, and Low are 1888, 608, and 135, respectively.

Figure 9:
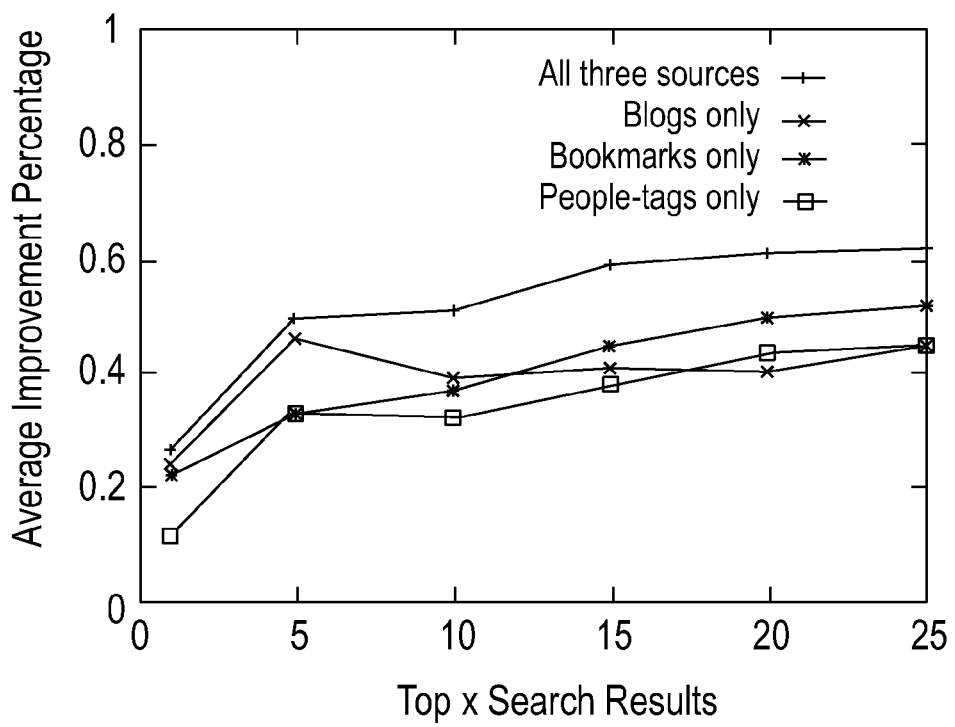
FIG. 9 is a graph illustrating a comparison between embodiments of the present invention that use information from multiple social systems with embodiments that use information from a single social system.

Experimental results are shown in Table 2 below and visualized in FIG. 9.

TABLE 2

| | Top x Search Results | 1 | 5 | 10 | 15 | 20 | 25 |
|---|---|---|---|---|---|---|---|
| High | Non-Personalized Recall | 0.035 | 0.129 | 0.235 | 0.303 | 0.374 | 0.424 |
| | Personalized Recall | 0.057 | 0.198 | 0.363 | 0.507 | 0.611 | 0.717 |
| | Improvement Percentage | 42.3 | 49.2 | 47.4 | 54.1 | 44.3 | 51.9 |
| | Non-Personalized Wins | 5 | 11 | 8 | 5 | 8 | 7 |
| | Personalized Wins | 12 | 17 | 19 | 23 | 25 | 27 |
| Medium | Non-Personalized Recall | 0.050 | 0.196 | 0.322 | 0.416 | 0.488 | 0.551 |
| | Personalized Recall | 0.067 | 0.263 | 0.422 | 0.545 | 0.629 | 0.701 |
| | Improvement Percentage | 23.3 | 45.4 | 38.2 | 43.5 | 34.2 | 34.7 |
| | Non-Personalized Wins | 2 | 4 | 7 | 5 | 4 | 5 |
| | Personalized Wins | 11 | 20 | 25 | 21 | 24 | 24 |
| Low | Non-Personalized Recall | 0.029 | 0.097 | 0.151 | 0.174 | 0.201 | 0.217 |
| | Personalized Recall | 0.041 | 0.134 | 0.189 | 0.224 | 0.255 | 0.274 |
| | Improvement Percentage | 28.1 | 24.9 | 47.3 | 56.9 | 60.8 | 51.5 |
| | Non-Personalized Wins | 2 | 2 | 4 | 3 | 6 | 7 |
| | Personalized Wins | 11 | 12 | 19 | 16 | 19 | 17 |

As can be seen from Table 2 above, Personalized had a higher average recall than Normal in all the three groups of users. The percentage of improvement on recall ranged from 23% to 60%. Furthermore, in all three groups, Personalized won much more users than Normal did. In general, the experimental results show that Personalized is effective both for users who are highly active and those how are less active.

Next, the inventors compared the performance of Personalized among different groups. From FIG. 9, Personalized performed better for High than for Normal. Personalized also performed better for High than for Low when only the first or top 5 search results for each query were considered. However, when at least the top 10 results were considered Personalized had similar performance for High and Low. Personalized is very effective even for users who do not have much available data in online social systems.

Multiple sources vs. Single source. The objective of the third set of experiments was to study whether using information from multiple social systems is superior to relying on information from a single source with regards to search personalization. In one example, Personalized gathers information from three social systems. The inventors wanted to determine if referring to more information sources indeed leads to better understanding of a user's backgrounds and preferences. In the inventors' experiments, they compared Personalized with its special versions, each of which uses information from only one social system. For convenience, these special versions of Personalized that use only blogs, only social bookmarks, and only people tags, Blogs, Bookmarks, and People-Tags, respectively. In the experiments, the inventors compared the four personalized search approaches over the baseline approach Normal. Experimental results are presented in Table 3 below and FIG. 10.

single-source personalized search approaches, Blogs, Bookmarks, and People-Tags, with Normal. As can seen from FIG. 10, all the three personalized approaches outperformed Normal, as all of them had positive improvement percentage over Normal. This indicates that the personalized search embodiments are effective even if only one social information source is available. Furthermore, the three single-source approaches had similar performance, which shows that the amounts of user information extracted from the three information sources can be close to each other.

Second, the inventors compare Personalized with its three special versions. From FIG. 10, Personalized performed better than People-Tags and Bookmarks in all cases. The recall of Blogs was similar to that of Personalized when only the first or top 5 results per query was considered. However Personalized considerably outperformed Blogs when more than the top 5 results were considered. These results demonstrate that utilizing information from multiple sources does allow the various embodiments to gather more comprehensive information about a user.

Effectiveness of adaption. The objective of the last set of experiments was to determine whether the adaptive schemes improve the performance of Personalized. Personalized employs three adaptive schemes: personalization degree 133 adjustment, estimation on the initial weights of information sources, and adjusting the weights of those sources after answering search queries. The inventors wanted to know if the three schemes have positive impact on the performance of Personalized. The inventors compared Personalized with its special versions, in which one or more of the adaptive schemes are disabled. For convenience, the special version that disables all the three adaptive embodiments is referred as None. Similar to the last set of experiments the inventors used

TABLE 3

| | Top x Search Results | 1 | 5 | 10 | 15 | 20 | 25 |
|---|---|---|---|---|---|---|---|
| Recall | All Three | 0.050 | 0.188 | 0.302 | 0.390 | 0.457 | 0.515 |
| | People-Tags Only | 0.041 | 0.163 | 0.265 | 0.341 | 0.402 | 0.450 |
| | Bookmarks Only | 0.047 | 0.167 | 0.274 | 0.355 | 0.425 | 0.475 |
| | Blogs Only | 0.048 | 0.176 | 0.280 | 0.364 | 0.425 | 0.484 |
| Improvement Percentage | All Three | 26.5 | 49.5 | 50.8 | 59.1 | 61.1 | 61.9 |
| | People-Tags Only | 11.4 | 33.1 | 32.0 | 37.8 | 43.3 | 44.5 |
| | Bookmarks Only | 22.1 | 33.0 | 37.0 | 44.7 | 49.6 | 51.5 |
| | Blogs Only | 23.8 | 45.8 | 38.9 | 41.0 | 40.0 | 44.2 |

Figure 10:
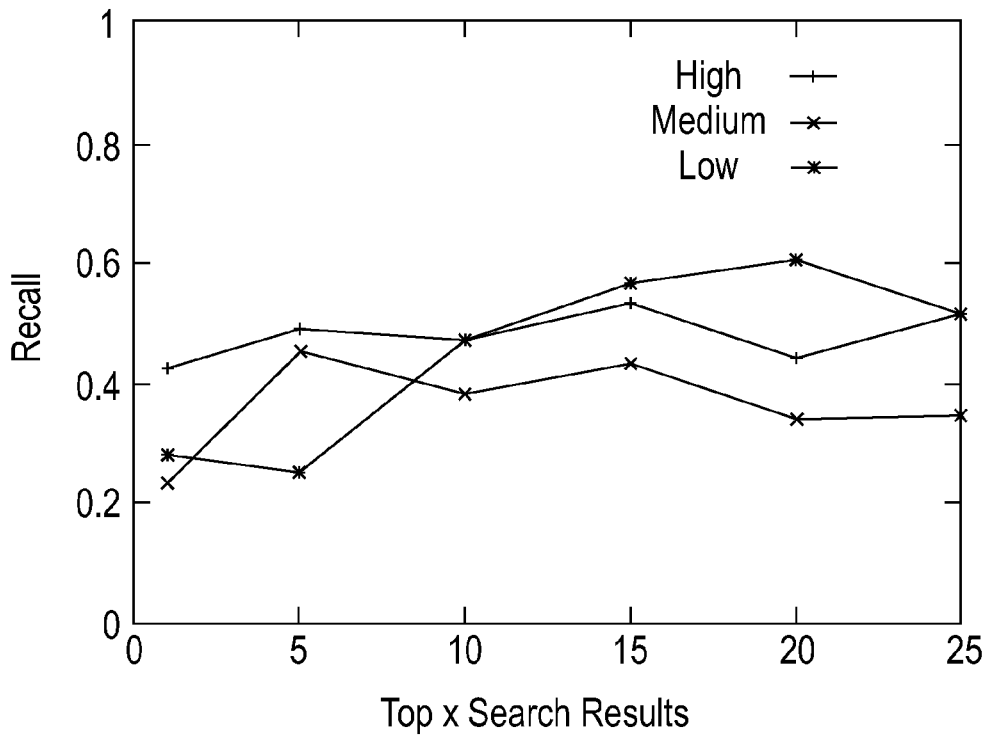
FIG. 10 is a graph illustrating a comparison of the effectiveness of various embodiments of the present invention among groups of users with different amount of social activity data.
Figure 11:
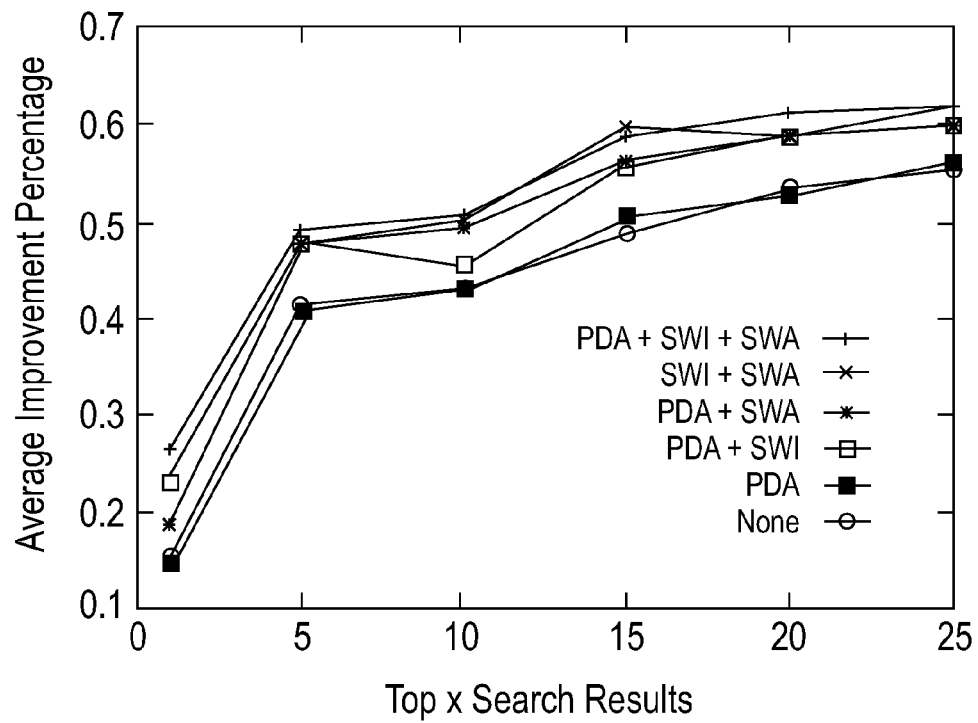
FIG. 11 is a graph that compares the effectiveness of various adaptive learning mechanisms with respect to embodiments of the present invention.

In Table 3 and FIG. 10, the improvement percentage of a personalized search approach is its improvement percentage on recall over Normal. First, the inventors compared the three Normal as a baseline approach for comparison purpose. Experimental results are presented in Table 4 below and FIG. 11.

TABLE 4

| Top x Search Results | | 1 | 5 | 10 | 15 | 20 | 25 |
|---|---|---|---|---|---|---|---|
| Recall | PDA + SWI + SWA | 0.050 | 0.188 | 0.302 | 0.390 | 0.457 | 0.515 |
| | SWI + SWA | 0.050 | 0.188 | 0.301 | 0.388 | 0.455 | 0.516 |
| | PDA + SWI | 0.048 | 0.188 | 0.298 | 0.385 | 0.452 | 0.510 |
| | PDA + SWA | 0.046 | 0.184 | 0.298 | 0.383 | 0.447 | 0.502 |
| | PDA | 0.044 | 0.175 | 0.283 | 0.364 | 0.430 | 0.481 |
| | None | 0.044 | 0.177 | 0.284 | 0.366 | 0.433 | 0.481 |
| Improvement Percentage | PDA + SWI + SWA | 26.5 | 49.5 | 50.8 | 59.1 | 61.1 | 61.9 |
| | SWI + SWA | 26.9 | 48.2 | 50.1 | 56.3 | 58.8 | 61.4 |
| | PDA + SWI | 23.0 | 47.8 | 45.6 | 55.7 | 58.8 | 59.8 |
| | PDA + SWA | 18.8 | 47.7 | 49.4 | 59.6 | 58.3 | 59.9 |
| | PDA | 14.4 | 41.1 | 43.2 | 50.7 | 52.8 | 55.8 |
| | None | 15.5 | 41.6 | 43.2 | 49.0 | 53.5 | 55.4 |

For simplicity, PDA, SWI, and SWA are used to denote the three adaptive embodiments, personalization degree 133 adjustment, source weight initialization, and source weight adjustment, respectively. First, the three adaptive schemes, when used together, have positive impact on the performance on Personalized. As can be seen from FIG. 8, PDA+SWI+SWA outperformed None. The improvement percentage of PDA+SWI+SWA over Normal is 7 to 10% more than that of None over Normal. This shows that adaptability is advantageous in general.

Non-Limiting Examples

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

What is claimed is:

1. A method, comprising:
receiving a search query from a user;
receiving, from a search engine, a set of search results that satisfy the search query;
identifying a user interest profile associated with the user, the user interest profile comprising a set of standalone user interest vectors combined into an overall user interest vector, wherein each of the set of standalone user interest vectors comprises a set of information associated with one or more activities performed by the user with respect to a corresponding social system, wherein each of the set of standalone user interest vectors is assigned a source weight based on a corresponding social system, wherein the source weight is adjustable based on a performance of the standalone interest vector with respect to personalizing the set of search results;
assigning a ranking score, based at least on the user interest profile, to each result in at least a subset of search results in the set of search results;
sorting the subset of search results based on the ranking score that has assigned to each result in the subset of search results;
sending the subset of search results that has been sorted to the user;
receiving a set of feedback information from the user associated with the subset of search results that have been sent to the user; and
updating the source weight associated with at least one of the set of standalone interest vectors based on the set of feedback that has been received.

2. The method of claim 1, wherein assigning a ranking score further comprises:
determining, for each result in the subset of search results, an interest-similarity score indicating a degree of correspondence between the each result in the subset of search results and at least one user interest vector in the user interest profile, the user interest vector comprising at least one keyword and an importance score indicating a degree of interest between the user and the at least one keyword.

3. The method of claim 2, wherein assigning a ranking score further comprises: assigning a final score to each result in the subset of search results by combining the interest-similarity score and a relevancy score associated with the each result, the relevancy score indicating a degree of relevancy between the each result and the search query, wherein combining the interest-similarity score and the relevance score is weighted by a personalization degree in the user interest profile.

4. The method of claim 1, wherein the user interest profile comprises a personalization degree, wherein the ranking score is based at least in part on the personalization degree.

5. The method of claim 4, further comprising:
receiving a set of feedback information from the user associated with the subset of search results that have been sent to the user; and
updating a weight associated with the personalization degree based on the set of feedback that has been received.

6. The method of claim 1, wherein the overall interest vector is obtained by combining the set of standalone interest vectors based on the source weight assigned to each standalone interest vector in the set of standalone interest vectors.

7. The method of claim 1, wherein at least one standalone interest vector in the set of standalone interest vectors is derived from a set of activities on at least one source social system.

8. The method of claim 1, wherein at least one standalone interest vector in the set of standalone interest vectors comprises a set of keywords and at least one importance score indicating a degree of interest between the user and the set of keywords.

9. The method of claim 8, wherein each keyword in the set of keywords is associated with an importance score above a given threshold.

10. The method of claim 1, wherein the one or more activities comprises:
   a social network posting;
   a blogging;
   a mutual commenting;
   a social bookmarking; and
   a mutual tagging.

11. A system, comprising:
   a memory;
   a processor communicatively coupled to the memory; and
   an adaptive search personalization module communicatively coupled to the memory and the processor, the adaptive search personalization module configured to:
      receive a search query from a user;
      receive, from a search engine, a set of search results that satisfy the search query;
      identify a user interest profile associated with the user, the user interest profile comprising a set of standalone user interest vectors combined into an overall interest vector, wherein each of the set of standalone user interest vectors comprises a set of information associated with one or more activities performed by the user with respect to a corresponding social system, wherein each of the set of standalone user interest vectors is assigned a source weight based on a corresponding social system, wherein the source weight is adjustable based on a performance of the standalone interest vector with respect to personalizing the set of search results;
      assign a ranking score, based at least on the user interest profile, to each result in at least a subset of search results in the set of search results;
      sort the subset of search results based on the ranking score that has assigned to each result in the subset of search results;
      send the subset of search results that has been sorted to the user;
      receiving a set of feedback information from the user associated with the subset of search results that have been sent to the user; and
      updating the source weight associated with at least one of the set of standalone interest vectors based on the set of feedback that has been received.

12. The system of claim 11, wherein assign a ranking score further comprises:
   determine, for each result in the subset of search results, an interest-similarity score indicating a degree of correspondence between the each result in the subset of search results and at least one user interest vector in the user interest profile, the user interest vector comprising at least one keyword and an importance score indicating a degree of interest between the user and the at least one keyword.

13. The system of claim 12, wherein assign a ranking score further comprises:
   assign a final score to each result in the subset of search results by combining the interest-similarity score and a relevancy score associated with the each result, the relevancy score indicating a degree of relevancy between the each result and the search query, wherein combining the interest-similarity score and the relevance score is weighted by a personalization degree in the user interest profile.

14. A computer program product comprising computer readable storage medium having computer readable program code embodied therewith, the computer readable program code comprising computer readable instructions configured to perform a method comprising:
   receiving a search query from a user;
   receiving, from a search engine, a set of search results that satisfy the search query;
   identifying a user interest profile associated with the user, the user interest profile comprising a set of standalone user interest vectors combined into an overall interest vector, wherein each of the set of standalone user interest vectors comprises a set of information associated with one or more activities performed by the user with respect to a corresponding social system, wherein each of the set of standalone user interest vectors is assigned a source weight based on a corresponding social system, wherein the source weight is adjustable based on a performance of the standalone interest vector with respect to personalizing the set of search results;
   assigning a ranking score, based at least on the user interest profile, to each result in at least a subset of search results in the set of search results;
   sorting the subset of search results based on the ranking score that has assigned to each result in the subset of search results;
   sending the subset of search results that has been sorted to the user;
   receiving a set of feedback information from the user associated with the subset of search results that have been sent to the user; and
   updating the source weight associated with at least one of the set of standalone interest vectors based on the set of feedback that has been received.

15. The computer program product of claim 14, wherein assigning a ranking score further comprises:
   determining, for each result in the subset of search results, an interest-similarity score indicating a degree of correspondence between the each result in the subset of search results and at least one user interest vector in the user interest profile, the user interest vector comprising at least one keyword and an importance score indicating a degree of interest between the user and the at least one keyword.

16. The computer program product of claim 14, wherein assigning a ranking score further comprises:
   assigning a final score to each result in the subset of search results by combining an interest-similarity score and a relevancy score associated with the each result, the relevancy score indicating a degree of relevancy between the each result and the search query, wherein combining the interest-similarity score and the relevance score is weighted by a personalization degree in the user interest profile.

* * * * *